2,921,079

CERTAIN POLYHALOGENOBENZYLTHIO-BENZOTHIAZOLES AND BENZOXAZOLES

Kenneth L. Godfrey, St. Albans, and John J. D'Amico, Nitro, W. Va., assignors to Monsanto Chemical Company, St. Louis, Mo., a corporation of Delaware No Drawing. Application January 10, 1958
Serial No. 708,070

7 Claims. (Cl. 260—306)

The present invention relates to methods of destroying or controlling vegetation and to herbicidal compositions. More particularly it relates to methods of destroying or controlling vegetation by applying thereto a toxic concentration of a compound containing the nucleus

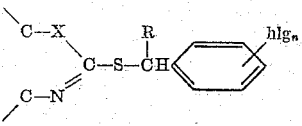

where R represents hydrogen or lower alkyl, X is sulfur or oxygen, hlg represents halogen and $n$ is an integer preferably 3 but may be 2–5. The nucleus may contain halogen, lower alkyl or an alkoxy group in the benzene ring of an azole radical. The halogen substituents are preferably chlorine but bromine and to a lesser extent iodine are also suitable. The position of the halogen is significant and the compounds containing halogen in the 2- and 6-positions are preferred. The alkoxy groups include the methoxy, ethoxy, propoxy and isopropoxy groups and alkyl includes methyl, ethyl, propyl, isopropyl and butyl.

The compounds of this invention comprise effective contact herbicides. Pre-emergence activity is also observed with some as well as formative action on certain plants. The toxicants may be applied conveniently in the form of a spray containing the active ingredient in a concentration within the range of 0.05 to 10.0% by weight. Thorough coverage of the foliage is effective for contact killing. For pre-emergence control of plants amounts within the range of 3 to 50 pounds per acre may be used. By applying the toxicant to the plant is meant any means whereby it is brought into contact with living plants, as for example by application to the ground before the plants emerge or by direct application to the foliage.

Although most of the toxicants are insoluble in water, they are soluble in common organic solvents. They may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzene sulfonate, an amine salt, as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fuller's earth. Usually the toxicant will be only a minor proportion. The dry formulation may be used as a dust or dispersed in aqueous medium before application. If the latter it is convenient to incorporate a wetting or dispersing aid into the formulation.

A spray containing a concentration of 0.5% of the active ingredient shown in Table I was applied to the foliage of bean plants, to the foliage of a mixture of grasses and finally to the foliage of a mixture of broad-leaved plants. The mixture is indicated in the table as "broadleaf." A rating of 0 indicates no phytotoxicity, 1 slight, 2 moderate and 3 severe phytotoxicity.

TABLE I

| Active ingredient | Phytotoxicity Rating | | |
|---|---|---|---|
| | Bean | Grass | Broadleaf |
| 2-(Pentachlorobenzylthio)benzothiazole | 2+ | 2 | 2+ |
| 5-Chloro-2-(2,6-dichlorobenzylthio)-benzothiazole | 1 | 1 | 1+ |
| 5-Chloro-2-(pentachlorobenzylthio)-benzothiazole | 0 | 1 | 2 |
| 6-Ethoxy-2-(pentachlorobenzylthio)-benzothiazole | 1 | 1 | 1+ |
| 2-(2,4,6-Trichlorobenzylthio)benzothiazole | 2+ | 1 | 2+ |
| 5-Chloro-2-(2,4,6-trichlorobenzylthio)-benzothiazole | 0 | 0 | 2 |
| 6-Ethoxy-2-(2,4,6-trichlorobenzylthio)-benzothiazole | 1 | 1 | 2 |
| 2-(2,3,6-Trichlorobenzylthio)benzothiazole | 3+ | 0 | 3+ |
| 5-Chloro-2-(2,3,6-trichlorobenzylthio)-benzothiazole | 3+ | 1 | 3+ |
| 6-Ethoxy-2-(2,3,6-trichlorobenzylthio)-benzothiazole | 3+ | 1 | 3 |
| 2-(x,x,x-Trichlorobenzylthio)benzoxazole | 2 | 0 | 2 |
| 2-(2,3,6-Trichlorobenzylthio)benzoxazole | 2 | 2 | 2 |

It was further found that 5-chloro-2-(2,3,6-trichlorobenzylthio)benzothiazole was still severely toxic to broadleaf plants at a solution concentration of 0.05% and 6-ethoxy-2-(2,3,6-trichlorobenzylthio)benzothiazole was moderately toxic to broadleaf plants at the same concentration. The x,x,x-trichlorobenzyl radical mentioned in the table was derived from a polychlorinated toluene having the average composition of trichlorobenzyl chloride. It is a mixture of several components and probably includes a number of isomers. Preparation is described in Example 8.

The data recorded in Table II demonstrate pre-emergence activity. The toxicant was applied at the rate of 25 pounds per acre and the phytotoxicity observed. It was further found that 5-chloro-2-(2,3,6-trichlorobenzylthio)benzothiazole retained activity at 3 pounds per acre and 6-ethoxy-2-(2,3,6-trichlorobenzylthio)benzothiazole retained slight activity at 5 pounds per acre:

TABLE II

| Active Ingredient | Results Observed |
|---|---|
| 5-Chloro-2-(2,3,6-trichlorobenzylthio)benzothiazole. | Moderate phytotoxicity to brome grass, mustard (radish) and beet-sugar. |
| 5-Chloro-2-(2,4,6-trichlorobenzylthio)benzothiazole. | Severe phytotoxicity to foxtail, brome grass, crab grass and beet-sugar; moderate phytotoxicity to mustard (radish). |
| 2-(2,3,6-Trichlorobenzylthio)-benzothiazole. | Severe phytotoxicity to foxtail, crab grass; moderate phytotoxicity to brome grass, barnyard grass and rye grass. |
| 5-Chloro-2-(pentachlorobenzylthio)benzothiazole. | Severe phytotoxicity to brome grass, beet-sugar, cotton and cucumber; moderate phytotoxixity to buckwheat. |
| 6-Ethoxy-2-(2,3,6-trichlorobenzylthio)benzothiazole. | Severe phytotoxicity to foxtail, brome grass, barnyard grass, beet-sugar and cotton; moderate phytotoxicity to crab grass and wild morning glory. |
| 2-(2,3,6-Trichlorobenzylthio)-benzoxazole.[1] | Severe phytotoxicity to buckwheat; moderate phytotoxicity to wild morning glory and pigweed. |
| 2-(x,x,x-Trichlorobenzylthio)-benzothiazole.[1] | Severe phytotoxicity to wild oats and foxtail; moderate phytotoxicity to wild morning glory and pigweed. |

[1] The phytotoxicity of these compounds was accompanied by chlorosis.

The following examples are illustrative but not limitative of the preparation of the toxicants.

Example 1

To 97 parts by weight (0.1 mole) of a 17.22% solution of sodium mercaptobenzothiazole was added in one portion 23 parts by weight (0.1 mole) of 2,4,6-trichlorobenzyl chloride. After stirring for 24 hours at room temperature, the reaction mixture was extracted with 300 ml. of ethyl ether. The ether solution was washed with water until neutral to litmus, dried over sodium sulfate and the ether removed in vacuo. A yield of 75% of 2-(2,4,6-trichlorobenzylthio)benzothiazole was obtained as a tan solid. After recrystallization from heptane it melted at 55–57° C. Analysis gave 3.7% nitrogen and 29.6% chlorine as compared to 3.9% nitrogen and 29.5% chlorine calculated for $C_{14}H_8Cl_3NS_2$.

Example 2

Substituting 23 parts by weight (0.1 mole) of 2,3,6-trichlorobenzyl chloride for the 2,4,6-trichlorobenzyl chloride of Example 1, the reaction mixture was stirred for 24 hours at room temperature and the product which precipitated was filtered, washed with water and air dried at room temperature. An 86% yield of 2-(2,3,6-trichlorobenzylthio)benzothiazole was obtained as a tan solid. After recrystallization from a solution of ethyl acetate and methyl alcohol in water, it melted at 63–65° C. Analysis gave 4.0% nitrogen, 17.8% sulfur and 29.2% chlorine as compared to 3.9% nitrogen, 17.8% sulfur and 29.5% chlorine calculated for $C_{14}H_8Cl_3NS_2$.

Example 3

In the procedure of Example 2, 20.2 parts by weight (0.1 mole) of 5-chloro-2-mercaptobenzothiazole, 16 parts by weight (0.1 mole) of 25% sodium hydroxide, 200 parts by weight of water and 23 parts by weight (0.1 mole) of 2,4,6,-trichlorobenzyl chloride were used. A yield of 92.8% of 5-chloro-2-(2,4,6-trichlorobenzylthio)benzothiazole was obtained as a tan solid. After recrystallization from heptane it melted at 113–115° C. Analysis gave 15.7% sulfur and 35.0% chlorine as compared to 16.2% sulfur and 35.8% chlorine calculated for $C_{14}H_7Cl_4NS_2$.

Example 4

To 21.1 parts by weight (0.1 mole) of 6-ethoxy-2-mercapto-benzothiazole, 16 parts by weight (0.1 mole) of 25% sodium hydroxide and 200 parts by weight of water was added in one portion 23 parts by weight (0.1 mole) of 2,3,6-trichlorobenzyl chloride. Following the procedure of Example 2, an 89% yield of 6-ethoxy-2-(2,3,6-trichlorobenzylthio)benzothiazole was obtained as a tan solid. After recrystallization from acetone it melted at 88–90° C. Analysis gave 3.6% nitrogen, 15.7% sulfur and 26.2% chlorine as compared to 3.5% nitrogen, 15.8% sulfur and 26.3% chlorine calculated for $C_{16}H_{12}Cl_3NOS_2$.

In similar manner 6-ethoxy-2-(2,4,6-trichlorobenzylthio)benzothiazole was obtained as a tan solid in 89.2% yield. After recrystallization from heptane it melted at 99–100° C.

Example 5

Substituting 23.0 parts by weight (0.1 mole) of 2,3,6-trichlorobenzyl chloride for the 2,4,6-trichlorobenzyl chloride in Example 3, there was obtained a 98% yield of 5-chloro-2-(2,3,6-trichlorobenzylthio)benzothiazole. It was a tan solid melting at 125–126° C. after recrystallization from ethyl acetate. Analysis gave 3.5% nitrogen, 16.3% sulfur and 35.7% chlorine as compared to 3.5% nitrogen, 16.2% sulfur and 35.9% chlorine calculated for $C_{14}H_7Cl_4NS_2$.

Example 6

To 190 parts by weight (0.2 mole) of a 17.6% solution of sodium mercaptobenzothiazole was added in one portion 59.8 parts by weight (0.2 mole) of pentachlorobenzyl chloride. The stirred reaction mixture was heated at 50–60° C. for 24 hours, cooled to 20° C., filtered, washed with water until neutral to litmus and air dried at room temperature. A yield of 91% of 2-(pentachlorobenzylthio)benzothiazole was obtained as a tan solid melting at 132–134° C. after recrystallization from heptane. Analysis gave 3.2% nitrogen, 14.4% sulfur and 41.4% chlorine as compared to 3.3% nitrogen, 14.9% sulfur and 41.3% chlorine calculated for $C_{14}H_6Cl_5NS_2$.

Example 7

To 40.3 parts by weight (0.2 mole) of 5-chloro-2-mercaptobenzothiazole, 32 parts by weight (0.2 mole) of sodium hydroxide and 300 parts of water was added in one portion 59.8 parts by weight (0.2 mole) of pentachlorobenzyl chloride. The 5-chloro-2-(pentachlorobenzylthio)benzothiazole was isolated as described in Example 6 and obtained in 72.5% yield as a tan solid. After recrystallization from chlorobenzene with addition of ethyl ether it melted at 140–142° C. Analysis gave 3.2% nitrogen, 13.8% sulfur and 44.6% chlorine as compared to 3.0% nitrogen, 13.8% sulfur and 45.8% chlorine calculated for $C_{14}H_5Cl_6NS_2$.

In similar manner 6-ethoxy-2-(pentachlorobenzylthio)-benzothiazole was obtained as a brown powder in 66.5% yield. After recrystallization from chlorobenzene with ethyl ether added it melted at 107–109° C.

Example 8

To a stirred solution of 37.8 parts by weight (0.25 mole) of mercaptobenzoxazole, 40 parts by weight (0.25 mole) of 25% sodium hydroxide and 250 parts by weight of water was added in one portion 46 parts by weight (0.2 mole) of x,x,x-trichlorobenzyl chloride prepared by chlorinating toluene in the ring in the presence of iron until the gain in weight corresponded to that calculated for trichlorotoluene and then removing the iron and chlorinating the side chain until the gain in weight corresponded to that calculated for trichlorobenzyl chloride. The stirred reaction mixture was heated at 90–100° C. for 8 hours, cooled to 25° C. and extracted with 400 ml. of ethyl ether. The ether solution was washed with water until neutral to litmus, dried over sodium sulfate and the ether removed in vacuo (1–2 mm.) at a maximum temperature of 80–90° C. The 2-(x,x,x-trichlorobenzylthio)benzoxazole was obtained in 65.5% yield as a viscous amber liquid. Analysis gave 3.8% nitrogen and 8.6% sulfur as compared to 4.1% nitrogen and 9.3% sulfur calculated for $C_{14}H_8Cl_3NOS$.

Substituting 2,3,6-trichlorobenzyl chloride for the x,x,x-trichlorobenzyl chloride, the 2-(2,3,6-trichlorobenzylthio)-benzoxazole was obtained in 87% yield as an amber semi-solid.

Example 9

To a stirred solution of 15.1 parts by weight (0.1 mole) of mercaptobenzoxazole, 16 parts by weight (0.1 mole) of 25% sodium hydroxide and 150 ml. of water was added in one portion 26.4 parts by weight (0.1 mole) of 2,3,4,6-tetrachlorobenzyl chloride. The reaction mixture was heated at 90–100° C. for 24 hours and then cooled to 25° C. After extracting with 300 ml. of ethyl ether, the ether solution was washed with water until neutral to litmus and dried over sodium sulfate. The ether was removed in vacuo at a maximum temperature of 30° C. and the solid product was air dried. After recrystallization from heptane the 2-(2,3,4,6-tetrachlorobenzylthio)benzoxazole melted at 81–83° C. The tan solid was obtained in 84.4% yield analyzing 3.8% nitrogen and 8.5% sulfur as compared to 3.7% nitrogen and 8.5% sulfur calculated for $C_{14}H_7Cl_4NOS$.

Example 10

To 50.4 parts by weight (0.25 mole) of 5-chloro-2-mercaptobenzothiazole, 40 parts by weight (0.25 mole) of 25% sodium hydroxide and 250 parts by weight of water was added in one portion 48.9 parts by weight (0.25 mole), of 2,6-dichlorobenzyl chloride and the stirred reaction mixture heated at 50–60° C. for 5 hours. After cooling to 10° C., the resulting solid was filtered, washed with water until the wash water was neutral to litmus and air dried at 25–30° C. A yield of 84.2% of 5-chloro-2-(2,6-dichlorobenzylthio)benzothiazole was obtained as a tan solid. After recrystallization from heptane is melted at 140–142° C. Analysis gave 3.8% nitrogen, 17.4% sulfur and 29.6% chlorine as compared to 3.9% nitrogen, 17.8% sulfur and 29.5% chlorine calculated for $C_{14}H_8Cl_3NS_2$.

Example 11

To 245 parts by weight (0.25 mole) of a 17.1% solution of sodium mercaptobenzothiazole was added in one portion 48.9 parts by weight (0.25 mole) of 2,6-dichlorobenzyl chloride. The stirred reaction mixture was heated at 50–60° C. for 5 hours, cooled to 25° C. and the reaction mixture extracted with 300 ml. of chloroform. The chloroform solution was washed with water until neutral to litmus, dried over sodium sulfate and the chloroform removed in vacuo. A yield of 59% of 2-(2,6-dichlorobenzylthio)benzothiazole was obtained as a tan solid which melted at 105–106° C. after recrystallization from heptane. Analysis gave 4.3% nitrogen, 19.6% sulfur and 21.8% chlorine as compared to 4.3% nitrogen, 19.7% sulfur and 21.7% chlorine calculated for $C_{14}H_9Cl_2NS_2$.

Example 12

To 17.2 parts by weight (0.1 mole) of 97% mercaptobenzothiazole, 16 parts by weight (0.1 mole) of 25% sodium hydroxide and 250 ml. of water was added in one portion 19.6 parts by weight (0.1 mole) of 2,5-dichlorobenzyl chloride and the stirred reaction mixture heated at 90–100° C. for 5 hours. After cooling to 25° C., the reaction mixture was extracted with 300 ml. of ethyl ether. The ether solution was washed with water until neutral to litmus and dried over sodium sulfate. The ether was removed in vacuo at a maximum temperature of 80–90° C./1–2 mm. The 2-(2,5-dichlorobenzylthio)benzothiazole was obtained in 86% yield as an amber oil. Analysis gave 4.2% nitrogen as compared to 4.3% calculated for $C_{14}H_9Cl_2NS_2$.

Substituting 0.1 mole of mercaptobenzoxazole for the mercaptobenzothiazole, the 2-(2,5-dichlorobenzylthio)benzoxazole was obtained in 77.4% yield as an amber oil.

In similar manner, 6-ethoxy-2-(2,5-dichlorobenzylthio)benzothiazole was obtained in 89.5% yield. It was a dark amber oil analyzing 3.96% nitrogen as compared to 4.05% calculated for $C_{16}H_{13}Cl_2NOS_2$.

Example 13

To 20.2 parts by weight (0.1 mole) of 5-chloro-2-mercaptobenzothiazole, 16 parts by weight (0.1 mole) of 25% sodium hydroxide and 250 ml. of water was added in one portion 19.6 parts by weight (0.1 mole) of 2,5-dichlorobenzyl chloride and the stirred reaction mixture heated at 90–100° C. for 5 hours. After cooling to 5° C. the reaction mixture was filtered, washed with water until neutral to litmus and air dried at 25–30° C. The 5-chloro-2-(2,5-dichlorobenzylthio)benzothiazole was obtained in 97% yield. After recrystallization from heptane it melted at 109–110° C. Analysis gave 17.8% sulfur and 29.2% chlorine as compared to 17.8% sulfur and 29.5% chlorine calculated for $C_{14}H_8Cl_3NS_2$.

Example 14

To 15.1 parts by weight (0.05 mole of 2-mercapto-4-ethoxy-6-anilinobenzothiazole, 8 parts by weight (0.05 mole) of 25% sodium hydroxide and 100 ml. of water was added in one portion 11.2 parts by weight (0.05 mole) of 2,3,6-trichlorobenzyl chloride and the reaction mixture heated at 50–60° C. for 6 hours. After cooling to 5° C., the solid was filtered, washed with water until neutral to litmus and air dried at 25–30° C. The 4-ethoxy-6-anilino-2-(2,3,6-trichlorobenzylthio)benzothiazole was obtained in 48.4% yield melting at 83–85° C. after recrystallization from ethyl alcohol. Analysis gave 5.0% nitrogen as compared to 5.6% calculated for $C_{22}H_{17}Cl_3N_2OS_2$.

It is intended to cover all changes and modifications of the examples of the invention herein chosen for purposes of disclosure which do not constitute departures from the spirit and scope of the invention.

What is claimed is:

1. A compound of the structure

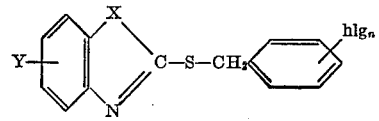

where Y is selected from a group consisting of hydrogen, halogen lower alkyl and lower alkoxy, X is selected from a group consisting of oxygen and sulfur hlg represents halogen and n is an integer from 3 to 5.

2. Trichlorobenzylthiobenzothiazole.
3. 2-(2,4,6-trichlorobenzylthio)benzothiazole.
4. 2-(2,3,6-trichlorobenzylthio)benzothiazole.
5. 6-ethoxy-2-(2,3,6-trichlorobenzylthio)benzothiazole.
6. 5-chloro-2-(2,3,6-trichlorobenzylthio)-benzothiazole.
7. 2-(2,3,6-trichlorobenzylthio)benzoxazole.

References Cited in the file of this patent

UNITED STATES PATENTS

| | | |
|---|---|---|
| 1,946,960 | Behrend | Feb. 13, 1934 |
| 2,057,319 | Scott | Oct. 13, 1936 |
| 2,110,834 | Orthner et al. | Mar. 8, 1938 |
| 2,776,977 | D'Amico | Jan. 8, 1957 |

OTHER REFERENCES

Frear et al.: J. of Economic Entomology, vol. 40, pp. 736–41 (1947).